United States Patent [19]

Peters

[11] Patent Number: 4,858,551
[45] Date of Patent: Aug. 22, 1989

[54] PORTABLE AND REUSABLE SAFETY MARKER FOR DISABLED VEHICLES

[76] Inventor: William H. Peters, Rural Route 3, Bryan, Ohio 43506

[21] Appl. No.: 163,785

[22] Filed: Mar. 3, 1988

[51] Int. Cl.$^4$ .............................................. B60Q 7/00
[52] U.S. Cl. .................................................... 116/30
[58] Field of Search ............... 116/28 R, 30, 173, 174, 116/175, 306, 309; 40/591, 600, 603; 242/77; 350/97

[56] References Cited

U.S. PATENT DOCUMENTS

| | | | |
|---|---|---|---|
| 938,221 | 10/1909 | Dallimore | 116/173 |
| 2,533,459 | 12/1950 | Holliday | 116/173 |
| 3,255,725 | 6/1966 | Von Kreidner et al. | 116/173 |
| 3,276,416 | 10/1966 | Dirks et al. | 116/28 R |
| 4,332,210 | 6/1982 | Lambert | 116/173 |
| 4,471,873 | 9/1984 | Thomas | 116/28 R |

Primary Examiner—William A. Cuchlinski, Jr.
Assistant Examiner—J. Hohenshell
Attorney, Agent, or Firm—George R. Royer

[57] ABSTRACT

The subject invention is a portable apparatus constructed to function as a safety warning device to be temporarily deployed on disabled motor vehicles or the like, such device comprising a container with an internal reel from which can be drawn a predetermined length of reflective material that can be placed around a part of the vehicle to serve as a reflectorized warning device. The container is a substantially cylindrical housing member having an internal rotatable shaft serving as the reel member around which is wound the strip of reflective material. The reflective strip of material has a lead edge which can be fed through a vertically disposed and longitudinally extending opening in the outer shell of the housing member. The lead end of the reflective strip is appropriately magnetized and the housing member is also magnetized to temporarily adhere a part of the reflectorized tape and housing member to the motor vehicle.

2 Claims, 2 Drawing Sheets

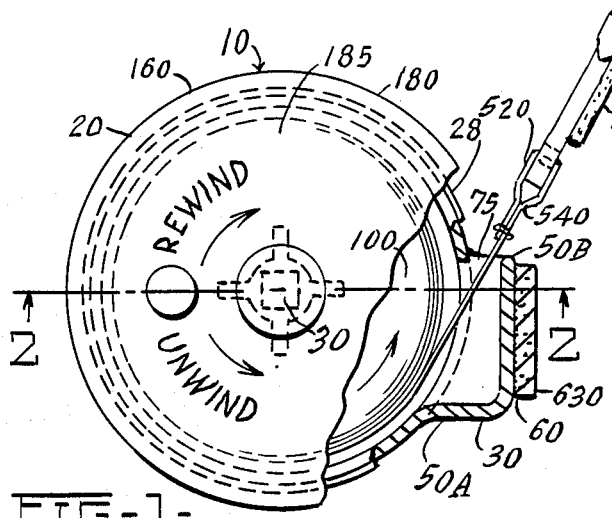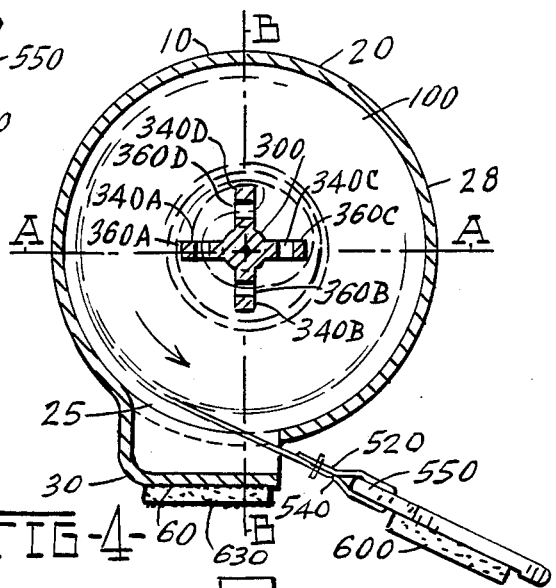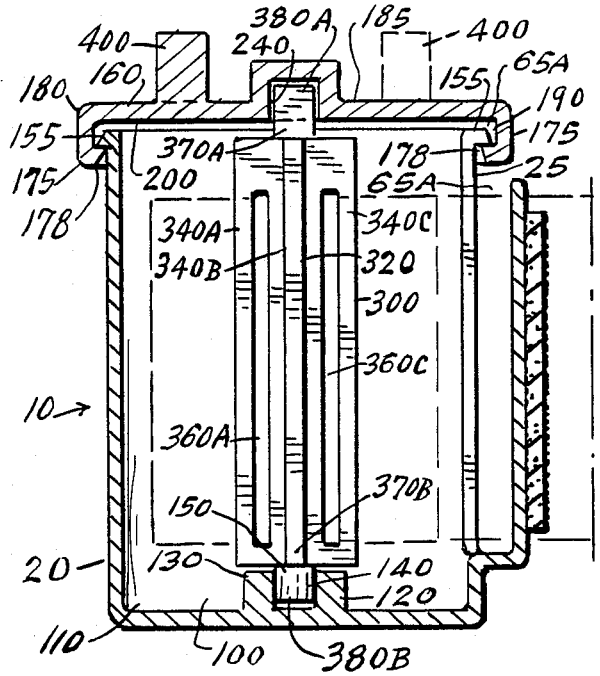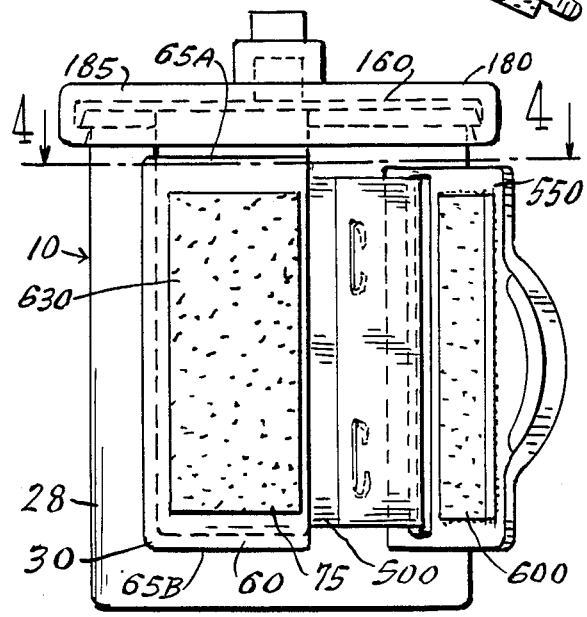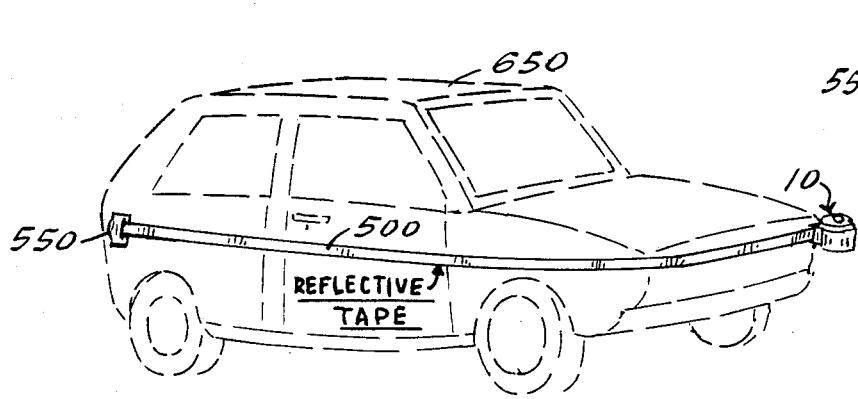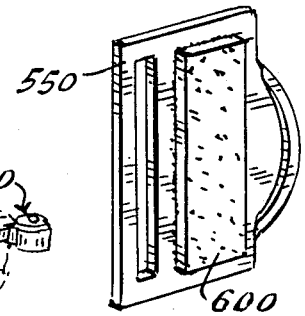

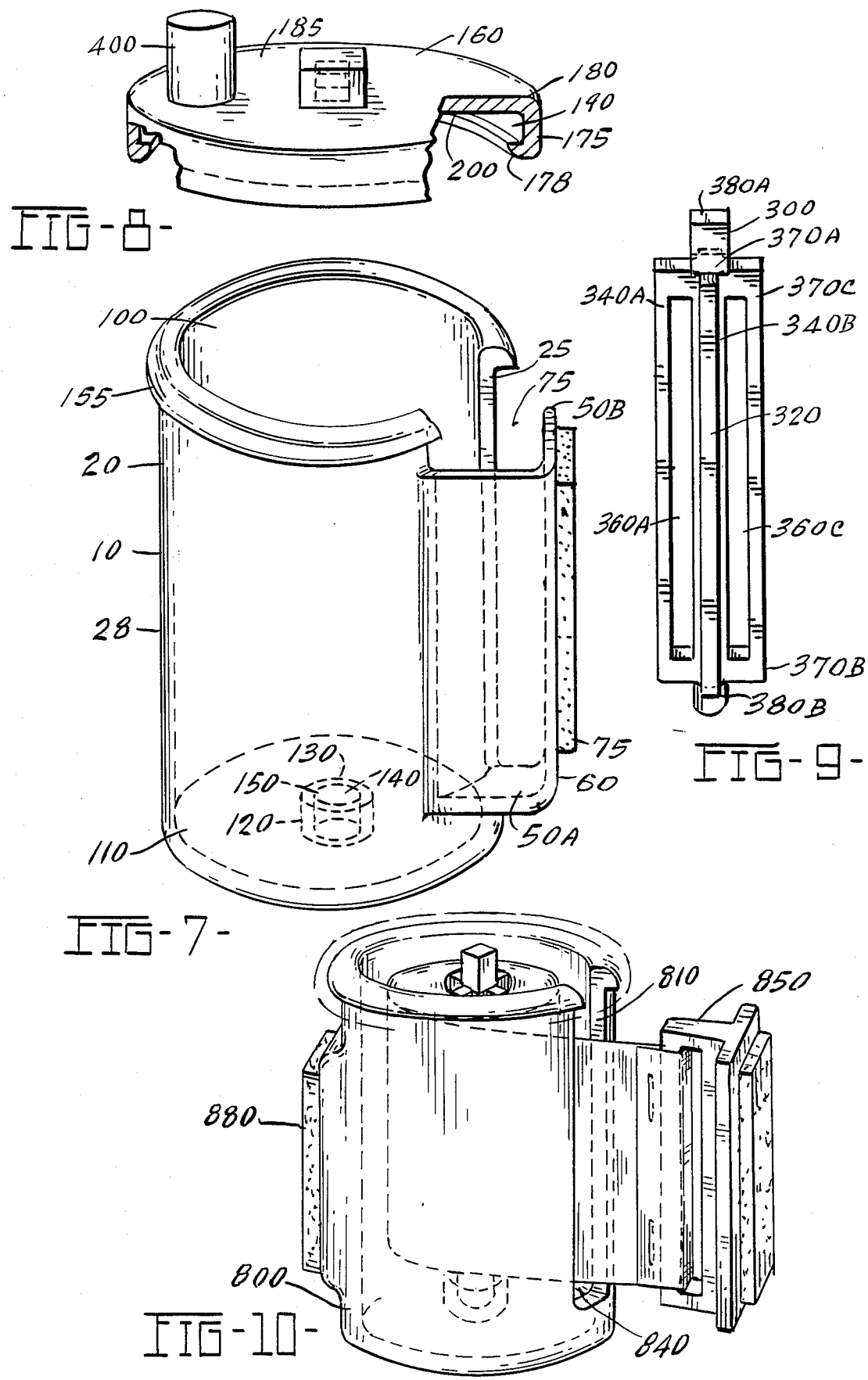

PORTABLE AND REUSABLE SAFETY MARKER FOR DISABLED VEHICLES

DESCRIPTION OF PRIOR ART AND BACKGROUND OF INVENTION

The subject invention is a safety apparatus specifically and generally constructed as a temporary warning device to provide a visual signal to others approaching a disabled vehicle. While the latter application is the primary thrust of the subject device, it has wider applications to other situations in which a temporary warning is needed, such as in marine situations or other similar circumstances.

One of the problems usually encountered with disabled vehicles located on or near roadways is the visability problem. Specifically, when other motorists approach an unlighted disabled vehicle at night, it is usually difficult to discern the motor vehicle or its precise position. This problem is particularly acute, as in many situations the disabled vehicle is on or near a travelled roadway and an approaching driver who is travelling at a moderate or high rate of speed may face the risk of collision with the disabled vehicle under such circumstances.

There are a myriad of visual devices used to warn drivers of such problems ranging from flares to reflectors, as well as many sophisticated devices. Such devices are only marginally effective and in many situations may be dangerous in their use and implementation in that they require a driver to walk back, in the darkness, a substantial distance in order to place the flare or reflector. Other dangers in their usage are obvious. Moreover, almost all known visual warning devices do not provide a complete delineation of the vehicle shape, size, location and disposition, and as a result the oncoming driver is not usually given a total perspective of such latter characteristics as the disabled vehicle.

Yet another problem with many existing devices that are used to provide a safety warning is their dispenseability. For example, flares can be expensive since they cannot be reused. Other safety devices share this expense feature. On the other hand, small reflectors adapted to be placed on the ground are difficult to retrieve and can be easily damaged. There are many other disadvantages with existing warning devices. The subject invention is provided as a device to overcome the foregoing problems and the following objects of the subject invention are directed accordingly.

OBJECTS

The following are the objects of the subject invention:

It is an object of the subject invention to provide an improved safety marking apparatus;

It is also an object of the subject invention to provide an improved marking apparatus for disabled motor vehicles;

It is also an object of the subject invention to provide an improved signal device to warn oncoming motorists at night of a disabled vehicle;

Still another object of the subject invention is to provide a safety device that can be reused;

Yet another object of the subject invention is to provide a device that can be easily and quickly installed around a disabled vehicle without attendant safety risks;

Still another object of the subject invention is to provide a totally effective safety warning device for disabled vehicles;

A further object of the subject invention is to provide a visually adapted warning device that is economical to use and manufacture.

Other objects will become apparent from a reading of the description taken in conjunction with the drawings and claims.

DESCRIPTION OF DRAWINGS

FIG. 1 is a top elevational view of the subject device, showing the housing member;

FIG. 2 is a top elevational view of the subject device showing a side elevational view in cross section of the housing apparatus used in the subject invention;

FIG. 3 is a side elevational view of the subject invention shown in cross-sectional configuration;

FIG. 4 is a top elevational view as shown in FIG. 3, with the marker tape shown as it is being initially drawn from the container;

FIG. 5 is a perspective view of the tape exist member used in the subject device.

FIG. 6 is a perspective view of a motor vehicle showing how the subject marker is emplaced about an automobile;

FIG. 7 is a perspective view of the outer shell member used as the container in the subject device;

FIG. 8 is a perspective view of the container top;

FIG. 9 is an end elevational view of the tape exit member.

FIG. 10 is a perspective view of the subject invention showing the tape extended.

DESCRIPTION OF GENERAL EMBODIMENT

The subject invention is a portable apparatus constructed to function as a safety warning device to be temporarily deployed on disabled motor vehicles or the like, such device comprising a container with an internal reel from which can be drawn a predetermined length of reflective material that can be placed around a part of the vehicle to serve as a reflectorized warning device. The container is a substantially cylindrical housing member having an internal rotatable shaft serving as the reel member around which is wound the strip of reflective material. The reflective strip of material has a lead edge which can be fed through a vertically disposed and longitudinally extending opening in the outer shell of the housing member. The lead end of the reflective strip is appropriately magnetized and the housing member is also magnetized to temporarily adhere a part of the reflectorized tape and housing member to the motor vehicle.

DESCRIPTION PREFERRED EMBODIMENT

In describing the preferred embodiment of the subject invention, it is to be noted that the following description shall be of one embodiment only of several that are within the scope of the invention herein, and this description of a particular embodiment shall not be considered as limiting the scope of the invention herein. Moreover, in describing the subject invention, the following nomenclature shall be used. The word "upper" shall refer to those areas directed above the ground level, while the word "lower" will refer to those areas the subject device is directed towards the ground level as appertaining to a vertically disposed device, as described.

Referring now to the drawings and particularly to FIGS. 1, 2, 3, 4 and 7, a vertically disposed housing member 10 is shown as being basically a cylindrically-shaped canister adapted to hold and store the safety tape hereinafter described. As can be determined, the housing member 10 is shown and described as a cylindrical member, however, the housing 10 may be of any constructional configuration other than cylindrical so long as it has an interior space that is suitably shaped and sized to hold a reel and safety tape in a rolled up storage position, as more fully described below.

As can be seen from the drawings, the canister housing 10 is shaped in a cylindrical manner in the preferred embodiment having an external cylindrical shell 20 which is cylindrical in its exterior configuration. This outer cylindrical shell 20 is preferably round and enclosed except for a vertically extending opening 25 in the vertical outer surface 28 of such shell 20. Such vertically extending opening is shaped in rectangular fashion in the preferred embodiment, however, this shape is not critical to the subject invention. As seen from a top elevational view, as in FIGS. 1 and 4, the cylindrical shell has a peripherally protruding exit housing 30 which functions to cover opening 25 from which the stored marker tape is drawn from within the container. Specifically, exit housing 30 is a radially outwardly and tangentially protruding extension of the cylindrical shell 20.

As can be seen from the drawings, the exit housing 30 is a parallelopiped housing member that serves as a protective and partial cover of the exit opening 25. Specifically, the exit housing has no side on that portion thereof that is joined against the vertical outer surface 28 of the cylindrical shell 20, which is adjacent to and surrounding the exit opening 25. The exit housing 30 has two lateral, vertical sides 50A and 50B, as shown, which sides are parallel to the specific diameter A—A of the circular upper surface formed by the upper circumference of the cylindrical shell 20, as shown in FIG. 4. The exit housing has a radially outwardly extending side 60, of vertical disposition, which latter side is completely enclosed. This latter outer side 60 is parallel to the specific diameter B-B shown in FIG. 4. Moreover, the exit housing 30 has an enclosed upper surface 65A and a similarly enclosed lower surfce 65B. As described and constructed, the exit housing 30 when positioned or formed as an integral portion of and against the outer surface 28 of the cylindrical shell 20, is an enclosed member having a hollow inner chamber, except for a secondary rectangular opening 75 of vertical disposition in the lateral vertical side 65B. In this latter respect, the secondary rectangular opening 75 in the lateral vertical side 65B is preferably of the same size and configuration as the opening exit 25 disposed in the lateral surface 28 of the cylindrical container 28. Additionally, it is preferable that such secondary exit opening 75 be disposed at about the same vertical level on the cylindrical container 20 as the exit opening 25, as can be determined from the drawings. As structured, the exit housing 30 functions as a protective exit mechanism for the marker tape stored inside the cylindrical shell 20, such interior storage arrangement and mechanism being more fully described immediately below.

Attention is addressed to FIGS. 2, 3 and 7 of the drawings in which the primary structure of the cylindrical shell 20 is shown. As can be seen, the cylindrical shell 20 comprising the main element of the housing 10 has an internally disposed chamber 100 which is essentially a cylindrically-shaped interior which conforms to the outer cylindrically-shaped shell 20.

The bottom interior surface 110 of the cylindrically-shaped shell comprises an even, smooth surface of generally circular configuration, except that integrally disposed in the center of such bottom is a vertically upwardly protruding knob 120 of generally cylindrical configuration, with such knob having a flat upper surface 130. Integrally formed vertically downwardly from the flat upper surface 130 of such knob 120 is a cylindrically-shaped depression 140 extending from its upper opening 150 in such flat upper surface to a level approximately even with the bottom interior surface 110, as can be seen in FIG. 2. This latter cylindrical depression functions as a bearing surface to receive a portion of a vertical rotatable shaft as more fully described hereinbelow.

Referring again to FIGS. 2, 3 and 7 of the drawings, the upper portion of the cylindrical shell 20 is open in the preferred embodiment having an upper circumferentially extending flanged lip 155. In order to enclose same, a circular cover plate 160 is provided to enclose the interior chamber 110. For this purpose, in the preferred embodiment of the subject invention, the cover plate 160 is a rounded, enclosed member as shown, having a downwardly extending flanged rim 175 of V-shaped configuration as seen in the cross-sectional view of FIG. 2. More specifically, the top cover plate 160 has a channeled circumferential rim 175 that depends vertically downwardly, from the upper circumferential edge 180 of the upper surface 185 of the top cover plate 160, for a minimal distance, and thence such rim 175 extends horizontally inwardly as a leg 178 in a direction parallel to the upper surface 180 of the top cover plate 160. By this latter formation disposition an inner channeled opening 190 of circumferential disposition is formed between the radially outer portion of the lower surface 200 of the top cover plate 160 and the horizontal leg 178 of the circumferential rim 175. This channeled opening 190, as seen in FIG. 2, is adapted to fit conformingly in a sealing and secure manner around the outer circumferential edge of the circumferential lip 155 on the upper circumferential edge of the container shell 20. This latter feature functions to permit the top cover plate 160 to be secured to the container shell 20 to complete the formation of the basic housing member 10. In the preferred embodiment of the subject invention, the channeled opening 190 embraces the circumferential lip 155 in a conforming and sealing manner, as described, but not in such a manner that prevents the top cover plate 160 from rotating about such circumferential lip 155, so that such top cover plate 160 can rotate about a vertical axis relative to the container shell 20, as chematically demonstrated in FIGS. 1 and 4.

Integrally formed into the center of the lower surface 200 of the top cover plate 160 is a cylindrically-shaped recess 240, preferably shaped, sized and structured similar to the cylindrically shaped depression 140 disposed in the knob 120 in the lower surface of the container shell 20. The recess 240 in the top cover plate functions as a bearing surface to rotatably hold the end of a cylindrically-shaped shaft portion, as more fully discussed below.

Attention is directed to FIGS. 1, 2 and 4 in which is shown a storage spool mechanism 300 which functions to store the marker tape. The storage spool 300 is essentially a longitudinally extending rotor mechanism having an interior longitudinally extending central spindle 320, which functions as the central spinal support for such spool 300. As can be seen, such central spindle has four integrally affixed wings 340A, 340B, 340C, and 340D, which wings are vertically extending members that are spaced around such central spindle 320 in an equi-distance manner, specifically being spaced ninety degrees apart in the preferred embodiment. As seen in figure 2, the respective wing members 340A, 340B, 340C, and 340D on the storage spool 300 are rectangularly-shaped members, each having a centrally disposed, rectangularly shaped opening 360A, 360B, 360C and 360D, extending completely through the wing, as shown. Integrally disposed on the upper and lower ends 370A and 370B of the central spindle 320 of the spool 300 are cylindrically-shaped shaft ends 380A and 380B respectively. Upper shaft end 380A is adapted to fit conformingly and securely in cylindrical recess 240. In the preferred embodiment of the subject invention, the upper shaft end 380B fits securely and fixedly in such recess 240 so that the spool 300 and the top cover plate 260 rotate as a unit. On the other hand, the bottom shaft end 380B is adapted to be rotatably mounted in the cylindrical recess 240 in the bottom surface 180 of the cylindrical shell 20, so that the spool 300 will be capable of rotating relative to such bottom surface.

Integrally disposed on the upper surface of the top cover plate 160 is an upwardly protruding knob 400 which functions to help turn the top cover plate in a circular direction, as diagrammatically shown in FIG. 1. This permits the spool 300 to turn as a unit with the top cover plate 160, to revolve freely within the interior chamber of container shell 20.

Affixed in a secure manner through one of the rectangular openings in the vertical wing extensions 340A, 340B, 340C and 340D is the inner end of a longitudinally extending marker tape 500. For this purpose, the marker tape 500 ideally and preferably comprises a flexible tape material of an arbitrary length that can be wrapped, in a circumferentially spiralling fashion, about the spool 300, as seen in FIG. 4, with the outer end 520 of the marker tape being linked by means of clamping mechanism 540 to an enlarged head portion 550. The head portion 550 of tape 500 is generally stored adjacent to the secondary exit opening in the exit housing 30, or inside such exit housing, so long as such head portion 550 is accessible. From the stored positions shown in FIGS. 1 and 4 the head end 550 of marker tape 500 is pulled radially and tangentially outwardly to the unwound extended position for use as described.

In the preferred embodiment of the subject invention, a magnetic member 600 is affixed to the face of the head portion 550, and a second and comparable magnetic member 630 is affixed to external surface 28 of the container shell 20, usually or ideally on the outer face of the exit housing 30. Once the tape is pulled from the extended position, it is placed about an automobile 650, in a general position shown in FIG. 6. Magnetic member 600 on the head portion s used to attach the head end 550 of the tape to one part of the vehicle, as shown, while the secondary magnetic member 630 is affixed to a distal portion of the automobile 650, as seen. For safety and marking purposes, the exposed side of the marker tape 500 is coated with a brightly luminescent material or paint to act as a reflector to mark the location and disposition of the vehicle. Once so used, the tape is removed and rewound back into the housing 10, as seen in FIG. 1.

As shown in FIG. 7, an alternate embodiment of the subject invention is shown, using a similar container as shown in figures 2 and 3, but without the attachment of a housing over the exit opening 25.

In yet another alternate usage of the subject invention, a person may use the subject safety device in bandoleer fashion and draw the safety tape around his chest or other body areas to demark himself as he walks in the evening, for emergency or non-emergency purposes.

In summary, the subject invention is a safety marking device for for a disabled vehicle comprising a housing member 10 having a hollow interior chamber 100, said housing member having a longitudinal central axis, and said housing member having an upper covering and a lower covering, and such housing member 10 having a vertical extending enclosure extending from such upper covering to said lower covering, and wherein such vertical enclosure forming an external shell and which external shell has a longitudinally extending slot therein communicating from the inside chamber 100 to the outside and wherein such slot is generally parallel to the longitudinal central axis of such housing member 10, and such housing member further having a longitudinally extending spool member 300 rotatably disposed inside said chamber 100 and disposed therein in a longitudinal manner parallel to the longitudinal central axis of such housing member 10 and wherein such spool member 300 is mounted in the housing 10 for rotatable movement within said housing, and such safety device further having marker tape 500 rotatably mounted in spiral fashion on such spool member 300, such marker tape 500 having a first end and a second end, such first end being affixed to the spool member and such second end being adapted to be drawn from the slot in the housing member 100 to areas outside thereof.

I claim:

1. A safety-marking device for a disabled vehicle comprising:
   (a) a housing member having a hollow interior chamber, said housing member having a longitudinal central axis, and said housing member having an upper covering and a lower covering, and said housing member having a vertical extending enclosure extending from said upper covering to said lower covering, and wherein said vertical enclosure has a longitudianlly extending slot therein communicating from the inside to the outside and wherein said slot is generally parallel to the longitudinal central axis of said housing member, and wherein said housing member has a circumferential lip over over the upper edge thereof, and wherein said slot has an L-shaped covering over a portion thereof to cover a portion of said slot in a vertically longitudinal manner;
   (b) longitudinally extending spool means disposed in a longitudinal manner parallel to the longitudinal central axis of said housing member and wherein said spool member is mounted in the housing for rotatable movement within said housing, said spool member being comprised of two intersecting planar members disposed about a central axial member, with each planar member having a longitudinal opening therein;
   (c) marker tape means rotatably mounted in spiral fashion on said spool means, said marker tape means having a first end and a second end, said first end being affixed to the pool means and said second end being adapted to be drawn from the slot in the housing member, said marker tape having magnetic means on the first end thereof.

2. A safety-marking device for a disabled vehicle comprising:

(a) a housing member having a hollow interior chamber, said housing member having a longitudinal central axis, and said housing member having an upper covering and a lower covering, and said housing member having a vertical extending enclosure extending from said upper covering to said lower covering, and wherein said vertical enclosure has a longitudinally extending slot therein communicating from the inside to the outside and wherein said slot is generally parallel to the longitudinal central axis of said housing member; and wherein said housing member has a circumferential lip over the upper edge thereof, and wherein said slot has an L-shaped covering over a portion thereof to cover a portion of said slot in a vertically longitudinal manner;

(b) longitudinally extending spool means disposed in a longitudinal manner parallel to the longitudinal central axis of said housing member and wherein said spool member is mounted in the housing for rotatable movement within said housing; said spool member being comprised of two intersecting planar members disposed about a central axial member, with each planar member having a longitudinal opening therein;

(c) marker tape means rotatably mounted in spiral fashion on said spool means, said marker tape means having a first end and a second end, said first end being affixed to the spool means and said second end being adapted to be drawn from the slot in the housing member, said marker tape having magnetic means on the first end thereof;

(d) cap means adapted to be disposed circumferentially and securely over the upper circumferential lip member on the housing member, said cap member being equipped with a mating lip on the casing member;

(e) magnetic attachment means on a portion of the outer surface of the casing member.

* * * * *